United States Patent
Bruestle et al.

(10) Patent No.: US 12,519,646 B2
(45) Date of Patent: Jan. 6, 2026

(54) ZERO KNOWLEDGE PROVER

(71) Applicant: Risc Zero, Inc., Seattle, WA (US)

(72) Inventors: Jeremy Bruestle, Seattle, WA (US); Brian Retford, Seattle, WA (US); Frank Laub, Seattle, WA (US)

(73) Assignee: RISC Zero, Inc., Seattle, WA (US)

( * ) Notice: Subject to any disclaimer, the term of this patent is extended or adjusted under 35 U.S.C. 154(b) by 0 days.

(21) Appl. No.: 18/761,104

(22) Filed: Jul. 1, 2024

(65) Prior Publication Data

US 2024/0356751 A1 Oct. 24, 2024

Related U.S. Application Data

(63) Continuation of application No. 17/991,750, filed on Nov. 21, 2022, now Pat. No. 12,028,457.

(60) Provisional application No. 63/311,809, filed on Feb. 18, 2022.

(51) Int. Cl.
| | |
|---|---|
| G06F 9/44 | (2018.01) |
| G06F 11/362 | (2025.01) |
| G06F 21/52 | (2013.01) |
| H04L 9/32 | (2006.01) |

(52) U.S. Cl.
CPC ........ H04L 9/3218 (2013.01); G06F 11/3636 (2013.01); G06F 21/52 (2013.01); *G06F 2221/033* (2013.01)

(58) Field of Classification Search
CPC ............ G06F 11/3636; G06F 11/3466; G06F 11/364; G06F 9/455; G06F 2221/2129; G06F 11/3612
See application file for complete search history.

(56) References Cited

U.S. PATENT DOCUMENTS

| | | | |
|---|---|---|---|
| 10,747,651 B1 * | 8/2020 | Vanderwall | G06F 11/3684 |
| 12,028,457 B2 * | 7/2024 | Bruestle | G06F 21/52 |
| 2009/0199901 A1 * | 8/2009 | Trassl | H01L 31/18 |
| | | | 257/E21.241 |

* cited by examiner

*Primary Examiner* — Chuck O Kendall

(74) *Attorney, Agent, or Firm* — Goodwin Procter LLP

(57) ABSTRACT

Methods, systems, and apparatus, including computer programs encoded on a computer storage medium, for implementing a zero knowledge prover are disclosed. In one aspect, a method includes the actions of executing a software program. The method further includes storing an execution trace that includes, for each address in memory, a value at each clock cycle during execution of the software program. The method further includes generating a sorted execution trace by sorting the execution trace. The method further includes determining a constraint for given values in the memory at adjacent clock cycles. The method further includes determining whether the sorted execution trace complies with the constraint and whether the sorted execution trace is a permutation of the execution trace. The method further includes providing, for output, data indicating whether the software program executed correctly while preventing outputting data included in the execution trace or the sorted execution trace.

20 Claims, 11 Drawing Sheets

```
I1: lw t1, 8(r0)
I2: sw t1, 24(r0)
I3: halt
```

Example Code (RICV-V)
200

FIG. 2

Example Execution Trace 300

FIG. 3

```
// cont = 1 for cycles where memory verification continues
cont := load(c) + reset(c) + decode(c) + comp(c) + apply(c);
// eval = 1 for cycles where memory is evaluated
eval := init(c) + cont
// addrDiff is the address increase from previous cycle
addrDiff := ckAddr(c) - ckAddr(w^-1 * c);
// cycleDiff is the cycle increase from previous cycle
cycleDiff := ckCycle(c) - ckCycle(w^-1 * c);
if (init(c)) {  // Handle initialization
    same(c) == 0;  // Same is always zero
    diff(c) == ckAddr(c);  // Diff must match initial address
}
if (cont) {  // Handle continuation
    same(c) * (1 - same(c)) == 0;  // Same must be binary
    same(c) * addrDiff == 0;  // If same is set, addresses must match
    // Diff is the addr diff if same = 0, else cycle diff
    // Subtract 1 to ensure diff is non-zero
    diff(c) == same(c) * cycleDiff + (1-same(c)) * addrDiff - 1
}
if (eval) {}
    // Bits must be binary
    bit0(c) * (1 - bit0(c)) == 0;
    bit1(c) * (1 - bit1(c)) == 0;
    bit2(c) * (1 - bit2(c)) == 0;
    bit3(c) * (1 - bit3(c)) == 0;
    // Diff must decompose into bits
    diff(c) == bit0(c) + 2*bit1(c) + 4*bit2(c) + 8*bit3(c);
    // Write must be binary
    ckWrite(c) * (1 - ckWrite(c)) == 0;
}
// For same addr, for non-writes, read must match prior value.
if (cont * same(c) * (1 - ckWrite(c)) {
    ckData(c) == ckData(w^-1 * c);
}
```

(Memory Verification Constraints)

FIG. 4

```
// Mix is a random field element selected by the verifier after the
// prover commits to the data register group (or in the Fiat-Shamir
// heuristic, based on the hash of the data register group).
mixID(c) := mix`0 +
           mix`1 * cycle(c) +
           mix`2 * inAddr(c) +
           mix`3 * inData(c) +
           mix`4 * isWrite(c);
mixCk(c) := mix`0 +
           mix`1 * ckCycle(c) +
           mix`2 * ckAddr(c) +
           mix`3 * ckData(c) +
           mix`4 * ckWrite(c);
if (init(c)) {
  // On init, reset products
  prodID(c) = mixID(c);
  prodCk(c) = mixCk(c);
}
if (last(c) + reset(c) + decode(c) + comp(c) + apply(c)) {
  // On continuation, multiply new values into running product
  prodID(c) = prodID(x`-1 c) * mixID(c);
  prodCk(c) = prodCk(x`-1 c) * mixCk(c);
}
if (fini(c)) {
  // On finalization, make sure that previous two products match.
  // Also, make sure the product is invertable.
  // Here we overload prodID(c) to be the shared product and
  // prodCk(c) to be the inverse of the shared product.
  prodID(c) = prodID(x`-1 c);
  prodID(c) = prodCk(x`-1 c);
  prodID(c) * prodCk(c) = 1;
}
```

(Permutation Validation)

FIG. 5

```
// H[0] - H[7] - Hash state
// M[0] - M[15] - Message words

// Copy message words to schedule array
for i from 0 to 15 {
  w[i] = M[i];
}
// Mix message schedule array
for i from 16 to 63 {
  ws0 = (w[i-15] >>> 7) xor (w[i-15] >>> 18) xor (w[i-15] >> 3);
  ws1 = (w[i-2] >>> 17) xor (w[i-2] >>> 19) xor (w[i-2] >> 10);
  w[i] = w[i-16] + ws0 + w[i-7] + ws1;
}
// Initialize working variables to current hash value:
a = H[0]; b = H[1]; c = H[2]; d = H[3];
e = H[4]; f = H[5]; g = H[6]; h = H[7];

// Compression function main loop:
for i from 0 to 63 {
  s1 = (e >>> 6) xor (e >>> 11) xor (e >>> 25);
  ch = choose(e, f, g);
  temp1 = h + s1 + ch + k[i] + w[i];
  s0 = (a >>> 2) xor (a >>> 13) xor (a >>> 22);
  maj = majority(a, b, c);
  temp2 = s0 + maj;

h = g; g = f; f = e;
  e = d + temp1;
  d = c; c = b; b = a;
  a = temp1 + temp2;
}

// Add the compressed chunk to the current hash value:
H[0] += a; H[1] += b; H[2] += c; H[3] += d;
H[4] += e; H[5] += f; H[6] += g; H[7] += h;
```

(SHA-256 Traditional Pseudocode)

FIG. 6

```
// H[0] - H[7] = Hash state
// W[0] - W[15] = Message words

// Initialize working variables to current hash value:
for i = 0 to 3 {
  a[i] = H[3 - i];
  e[i] = H[7 - i];
}
// Compression function main loop:
for i from 4 to 67 {
  // Compute message schedule (w)
  if (i < 16) {
    w[i] = W[i-4]
  } else {
    ws0 = (w[i-15] >>> 7) xor (w[i-15] >>> 18) xor (w[i-15] >> 3);
    ws1 = (w[i-2] >>> 17) xor (w[i-2] >>> 19) xor (w[i-2] >> 10);
    w[i] = w[i-16] + ws0 + w[i-7] + ws1
  } s1 = (e[i-1] >>> 6) xor (e[i-1] >>> 11) xor (e[i-1] >>> 25);
  ch = choose(e[i-1], e[i-2], e[i-3]);
  temp1 = h + s1 + ch + K[i-4] + w[i];
  s0 = (a[i-1] >>> 2) xor (a[i-1] >>> 13) xor (a[i-1] >>> 22);
  maj = majority(a[i-1], a[i-2], a[i-3]);
  temp2 = s0 + maj;

// Update a + e
  e = a[i-4] + temp1;
  a = temp1 + temp2;
}
// Finalize state
for i from 68 to 71 {
  H[71 - i] = a[i-4]
  H[75 - i] = e[i-4]
}
```

(SHA-256 Modified Pseudocode)

FIG. 7

ZERO KNOWLEDGE PROVER

CROSS-REFERENCE TO RELATED APPLICATION

This application claims the benefit of U.S. patent application Ser. No. 17/991,750 filed on Nov. 21, 2022, which claims the benefit of U.S. Provisional Patent Application No. 63/311,809, filed on Feb. 18, 2022. The entire disclosure of each of which is hereby incorporated by reference.

BACKGROUND

A zero knowledge proof (ZKP) may include a method by which one party (prover) can prove to another party (verifier) that a given assertion is true while the prover avoids conveying additional information apart from the asserted fact that the statement is indeed true. A feature of ZKPs is that it is trivial to prove that one possesses knowledge of certain information by simply revealing it; the challenge may be to prove such possession without revealing the information itself or any additional information. ZKP proofs may include probabilistic proofs rather than deterministic proofs. However, there are techniques that may lessen soundness error to negligibly small values.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 2 illustrates an example code for a program in a case where the processor includes an RISC-V.

FIG. 3 illustrates an example execution of the code in FIG. 2.

FIG. 4 illustrates a possible specific set of constraints for a set of verification constraints.

FIG. 5 illustrates an example of the permutation checking constraints.

FIG. 6 illustrates an example pseudocode for the mixing function.

FIG. 7 illustrates an example where code is transformed to operate on an array of actual/expected (A/E) values so that each update sets the latest value of A/E values on the prior four values.

DETAILED DESCRIPTION

Figure 1:
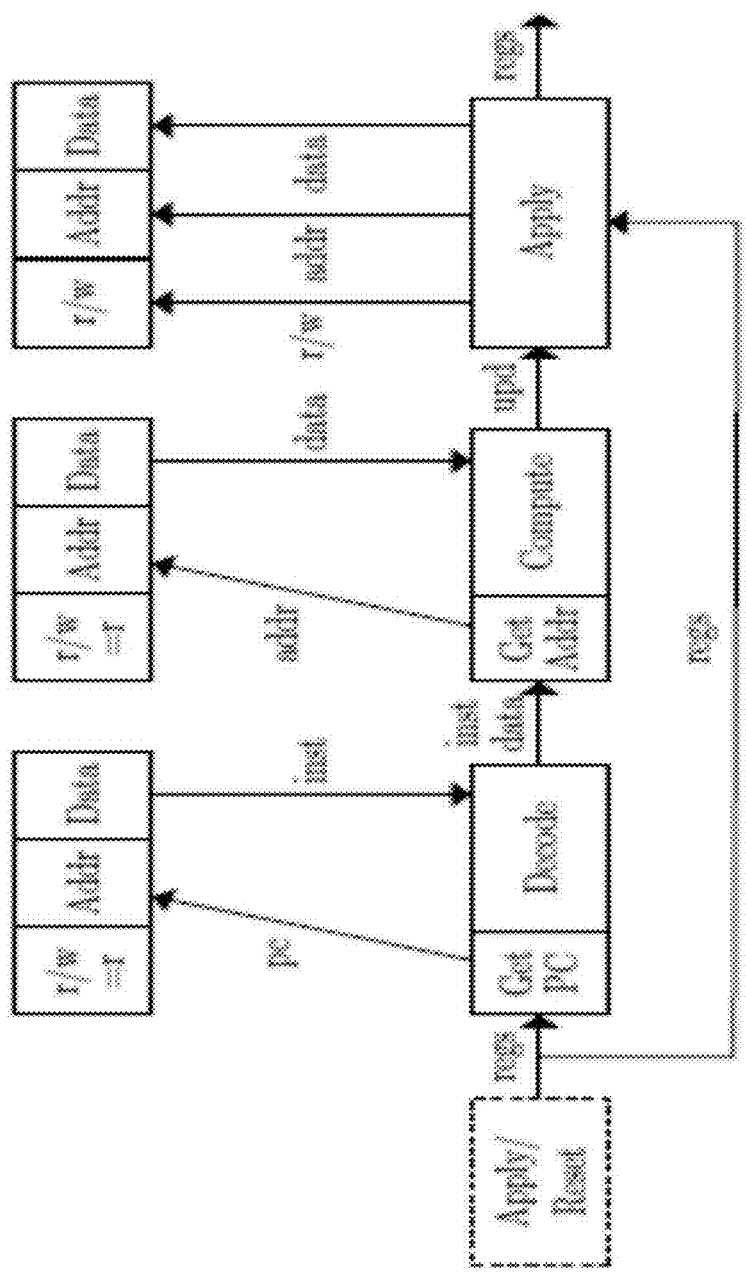
FIG. 1 is an example processor model that can be used to implement the ZKP system as described herein.

A zero knowledge proof (ZKP) system that may facilitate a creation of ZKPs to prove a correct execution by a machine in a Von Neumann architecture or an existing Instruction Set Architecture (ISA) e.g., RISC-V is described herein. The created ZKPs may include a recursive feature to prove verification of other proofs. The ZKPs may also be post-quantum secure by not relying on cryptographic primitives. In one or more embodiments, the created ZKPs may include secure mathematical transformations that can be implemented by arithmetic circuits. The secure mathematical transformation may include a set of arithmetic constraints in a proper form, which can represent the execution behavior of the machine. The ZKP system may execute the arithmetic circuits. In addition to the secure mathematical transformations, the ZKP system may further implement cryptographic strength of a proof system and various primitives (e.g., hashing algorithms) when evaluating the ZKP system. In this regard, the ZKP system may be able to prove the correct execution of a virtual processor—enabling compilable programs to be run in a provable manner.

In the Von Neumann architecture, a compiler may transform a recursive ZKP algorithm or algorithm representation into an arithmetic circuit that the ZKP system can execute. The compiler may include a computer program that translates computer code written in one programming language into another language e.g., target language to create an executable program. In at least one embodiment, the ZKP system may implement a RISC-V core instruction set along with a representation of RAM when executing the arithmetic circuit. The ZKP system may further implement a processor model for a proof of system requirements and memory verifications as further described in detail below.

Zero Knowledge Proofs (ZKPs)

Improvements in the ZKPs may include non-interactive versions, probabilistically-checkable proofs, zk-SNARKs, and zk-STARKS, which allow the proving of arbitrary statements in NP languages.

Recursive ZKP systems may provide additional scaling properties to ZKPs. Some ZKP systems may be succinct such that as the complexity of the statement to be proven grows, verification time goes up sub-linearly. For any succinct proof system, for a sufficiently large proof, the verification of the proof may fit within the proof itself. For earlier proof systems, this 'breakeven' point was impractically large.

Using recursion, the ZKP system may be used to chain proofs, verifying the prior proof and adding additional statements. Interested parties may need only to verify the head of the proof chain to prove that the entire history is correct. This allows 0(n) proof time and 0(1) verification time of arbitrarily large histories, avoiding the need for all nodes to retain the full chain history.

Recursion can also be used to 'roll up' a proof of n transactions into a single transaction in parallel via a tree construction, enabling horizontal scaling of transaction proofs. Each transaction may be proven once by a single party and recursively proven up a binary tree, eventually representing the entire tree with a single proof.

The core performance metrics of recursive proof systems may include the overall speed of the proof system (measured in arithmetic gates proven per second or similar), the time to prove a recursive proof, and the speed of any VMs being employed. The cryptographic strength of the proof system and the various primitives it uses (e.g., hashing algorithms) may also factor in evaluating ZKP systems.

Arithmetization

To implement a ZKP to prove a complex predicate, the predicate may be first converted into a mathematical form that is compatible with the underlying proof system. In the case of zk-STARKs, this may include a system of polynomial constraints over elements of a finite field. By analogy with digital circuits, this set of constraints can also be called a 'circuit', but in an arithmetic circuit each 'wire' has a value from a finite field rather than a binary value, and the 'gates' are polynomial constraints. The values being proven correct may be called the 'witness'.

In the specific arithmetization used in what follows (which is a variant of AIR) the witness may be made up of various 'registers', each of which has a specific value for each 'cycle', the value being an element of a finite field. Accordingly, the full state of the witness can be considered a 2-dimensional grid or matrix of finite field elements, where each row can be a register and each column a cycle. Notationally, r(c) may be used to represent the access of register r at cycle c.

In at least one embodiment, the cycles used in a witness may include elements of a subgroup of the multiplicative group of the finite field used for the circuit. This subgroup may include a generator, written as ω which when multiplied by a given cycle advances it one logical time step. So to refer to register r three cycles forward of c, one may write $r(\omega^3 c)$. Because the subgroup is finite, for some N, we have $\omega^N=1$, and thus the cycles are circular in nature (that is after N forward steps we arrive again at the same cycle).

The constraints of a circuit may be made invariant over the cycle, true for all cycles in the subgroup. The constraints can be further represented as a polynomial over some 'taps', where each tap represents the state of a specific register at a specific relative cycle offset. For example, a constraint forcing a register r to be 0 or 1 for all cycles might be written as:

$$r(c)(1 - r(c)) = 0$$

A constraint requiring a register to increase by 1000 every cycle would be written as:

$$r(\omega c) = r(c) + 1000$$

Registers can be grouped into logical 'register groups'. The underlying zero knowledge proof system may commit to registers via encoding them in a Merkle tree. Registers in separate groups can be committed to in different Merkle trees. This may allow, for example, one register group to be public, known by both the prover and the verifier, and another register group to be private, known only to the prover. Additionally, this may allow the prover to commit to one set of registers before the selection of some verifier chosen random numbers, and others after the selection.

Support for non-local permutation constraints based on the mechanisms used may also be presumed, and relies on the notion of register groups above. This may allow a verification that the values of a first set of registers are a permutation of the values of some second set of registers.

Recursive zk-STARK Proof System

Recursive proof systems may be built on zk-SNARK based methods. The verification circuit for zk-SNARKs can be made very small, making the breakeven point for recursion reachable; however, zk-SNARK based approaches may exhibit drawbacks—the provable circuit size is smaller and the performance per gate is lower. They are not post-quantum either, owing to their reliance on elliptic curve cryptography. zk-SNARK systems cannot use ordinary hash functions such as SHA-256 due to the size of the hash circuit, relying instead on a risky family of hashes developed explicitly for finite fields.

Because zk-STARK circuits are log (N) and succinct they can be used in recursive proof systems; however, these have been largely considered impractical due to the very large size of the verification circuit. Due to efficiency improvements described herein, the system introduced here may be zk-STARK based.

Encoding of User Predicate

In at least one embodiment, the user may be able to represent the computations that the user desires to prove in some manner. The representation of the computations may then be transformed into an arithmetic 'circuit' which the proof system executes. The efficiency of this translation is useful for many scenarios, most notably recursion.

Various systems have been created to enable programmers to write circuits using EDSLs or in bespoke languages. These systems can be impractical to utilize for many applications. For example, recent efforts include designing a custom VM or emulating the Ethereum VM. While VMs may be an improvement over directly writing circuits, they can limit the audience for and applications of these systems.

In one or more embodiments, a ZKP procedure may describe a complete implementation of the RISC-V core instruction set along with a representation of RAM into an arithmetic circuit. The ZKP system can be used to prove the correct execution of this virtual processor—enabling almost any compilable program to be run in a provable manner. This method may allow proofs to be written in ordinary software and for the system behavior to be reasoned about by ordinary developers. For example, code may appear to be executing on a fully secure chip, similar to an enclave; however, the security need not come from specialized hardware with secret keys, but may come from consumer hardware and provably secure mathematical transformations—the only cryptographic assumption being the safety of the chosen hash (typically SHA-256).

Hashing Circuits

To reduce the cost for recursive proofs, a size of the verification circuit may be reduced or minimized. A computationally significant part of verifying zk-STARK proofs may consist of cryptographic hashing. Commonly used hashes such as SHA-256 may not perform well in arithmetic circuits. This means that most existing recursive proof systems may use less standard 'field friendly' hashes such as Rescue. This may have a side effect of slowing down the non-recursive use of hashing, and in addition, lowering practical security, as the new field-friendly hashes have had much less cryptanalysis. Through careful analysis and the utilization of improved arithmetization as described herein, a suitable SHA-256 circuit may be constructed. Similar carefully developed circuits may accelerate other core parts of the verification process, enabling the zkVM ZKP circuit to be proven recursively.

Specification

We now describe how to efficiently instantiate a von Neumann architecture within a zero knowledge proof system. As a concrete example, we consider building an emulation of a processor along with associated RAM. In this example, we consider the processor to be of the RISC-V ISA, in part due to the simplicity of implementation, although the methods used are general and could be applied to another architecture. To achieve this, we may represent the execution behavior as a set of arithmetic constraints of the proper form. In at least one embodiment, we represent the operation of the processor and the memory over time as an execution trace. We may then constrain the execution trace via cycle invariant polynomial constraints between the current cycle and some prior cycles.

Converting Combinational Digital Circuits

In one or more examples, a digital combinational circuit can be represented as a constraint system consisting of a set of registers, one for each wire in the digital circuit, and a set of polynomial constraints whose degree is at most 2.

First, a register which is a value in a finite field can be constrained to 0/1 values for all of c via the constraint:

$$r(c)(1 - r(c)) = 0$$

Additionally, we can implement the standard logic gates via degree <2 polynomials as follows:

not(r)→(1−r(c))
and(r,s)→r(c)s(c)

$$\text{or } (r, s) \rightarrow 1 + r(c) + s(c) - r(c)s(c)$$

We also describe how to implement encoding/decoding from a set of registers representing bits (often used in a combinational circuit) to/from a single field element, so long as the characteristic of the field is greater than $2^n$, where n is the number of bits so encoded.

We define registers $r_i$, for $0 \le i < n$, and a register s which represents the encoded value. Furthermore, we can constrain the s to be the value encoded by the bit registers r via:

$$\forall_i \; r_i(c) * (1 - r_i(c)) = 0$$

$$s(c) = \sum_i 2^i r_i(c)$$

This equation represents n separate constraints, each of degree 2, and the second constraint is of degree 1, since the values 2' are constants.

Representing Constraints

When representing constraints, to simplify presentation, we may use two bits of 'syntactic sugar'.

First, we may allow the notion of an alias, which allows some sub-expression to be reused by multiple constraints, or even just computed into a more meaningful name. We can represent aliases using a syntax of <alias>:=<expr>, for example isValid:=isValidA(c)+isValidB(c).

Second, we may allow the notion of conditional constraints. We can allow constraints to exist within a control structure similar to an 'if' in a program language, where the condition is an expression. For example, the following:

```
if (cond(c)) {
    val1(c) = = val2(c);
}
```

Can be reduced to:

cond(c)*(val1(c)−val2(c));

Proof System Requirement

In at least one example, we may presume the proofs described by the constraints herein are instantiated as a zk-STARK. We may have a minimum requirement on the field size: for example, it can be larger than the number of cycles for the process under simulation. Additionally, we may assume that the field is as large as the word size of the processor under simulation for simplicity, however, one can simply replace any data and or address registers with multiple registers encoding ranges of bits. The field may also be sufficiently large to guarantee security under the Plonky protocol, as well as the DEEP-ALI and FRI protocols. In many cases, this requirement can be reduced by making the register trace use a subfield of a larger field, and using the larger field only in security-critical points. In addition, we presume that the protocol supports accessing multiple prior cycles and that the proof system can allow multiple register groups, encoded in different Merkle trees.

FIG. 1 is an example processor model 100 that can be used to implement the ZKP system as described herein. In at least one embodiment, the processor model 100 may be a black box that can be represented by a set of combinational circuits. Each execution of an instruction may be divided into three phases such as, without limitation, decoding, computing, and applying. The decoding may include loading of the instruction from RAM and decoding the instruction. The computing may optionally perform a data load and perform instruction computation. The applying may include updating the register state and optionally performing a data store.

In one or more embodiments, the decoding and computing phases may be logically divided into two combinational parts. The first part may include computing an address (if any) to read from, and the second part may include operating on the inputs from the prior phase as well as the value returned from memory.

Referencing the processor model 100, an initial reset cycle may be run to clear the state of processor registers and establish the initial PC. During a decode cycle, the RAM may be queried to get the next instruction, which is then decoded, and used to extract the set of registers used by the computation from the full set of registers from the prior cycle. This instruction data may be read by the compute cycle to initially get the memory address (if any) to read, the results of which can be used along with the instruction data to compute new values to place into registers or write to memory. Finally, in the apply cycle, the registers may be updated based on the computed results and the prior version of the registers (read via cycle-3), and optionally memory is written to.

In at least one example, memory transactions may be presumed to be full word sized and aligned. For partial writes, for example, a byte sized write, the full word that a byte resides in may be read during the compute cycle, updated with the byte to write, and then the full word can be written back in the apply cycle. In the processor model 100, each box shown in the processor logic (the lower half of the diagram) may be purely combinatorial and can be converted to constraints in a straightforward way.

Memory Verification

A normal processor may be represented efficiently by providing a mechanism to emulate RAM. To do this in embodiments described herein, we verify that the set of all memory transactions during execution is valid. However, absent knowing the distance in cycles between a read and write a priori, the transactions cannot be validated via normal polynomial constraints. Instead, we represent all memory transactions twice during the execution trace, once ordered by the cycle on which they occur, and concurrent with the use of that read/write, and a second time ordered first by the address and secondarily by the original cycle. This second ordering of memory transactions allows them to be verified since all accesses which relate to each other are immediately next to each other in the execution trace. In combination with the verification that the two sets of memory transactions are a permutation of one another via the Plonk mechanism, we can verify the correctness of the memory subsystem.

Register Groups

In one or more examples, the program code may be placed in a separate register group, called the 'code group' for which the full trace is known to both the prover and verifier. The majority of the registers used for validation are in the 'data group'. To additionally validate the permutation for Plonk, and to perform this validation after the prover has committed to the two orders of memory transactions, we may also have a third register group, called the 'acc group' for accumulation, since its job is largely to accumulate the products of the two mixed permutations. These three groups are visible in the example execution trace in FIG. 3.

Initialization, Finalization, and Code Loading

In addition to normal execution, the startup of the processor and loading of the program code may be represented in a similar way. This code trace includes the code to load (which is public), and may additionally contain control registers that provide setup and teardown support. For example, the code group may begin with an 'initialization' cycle, followed by some number of load cycles, each of which writes a single instruction or static data word to its appropriate location. A 'reset' cycle prepares for execution, followed by some number of decode/compute/apply cycles, and a 'finalize' cycle verifies that the program has terminated and validates the full memory trace completed correctly. Following this, the code group consists of all zeros. Since constraints are dependent on some element of the code group, this means that the data group and acc group can have arbitrary values for this set of cycles, enabling zero knowledge in the proof system.

FIG. 2 illustrates an example code 200 for a program in a case where the processor includes an RISC-V like ISA. The example code 200 may read a word from memory address 8 and write the word to memory address 24. The code 200 may then terminate using the mnemonic "halt." Note that halt may not be considered a standard RISC-V mnemonic. Another method to represent terminations may be used so long as the instruction decoder recognizes the termination. In the illustrated example, we presume that the code is loaded at address 0. This means that the load is for instruction 13.

Figure 3:
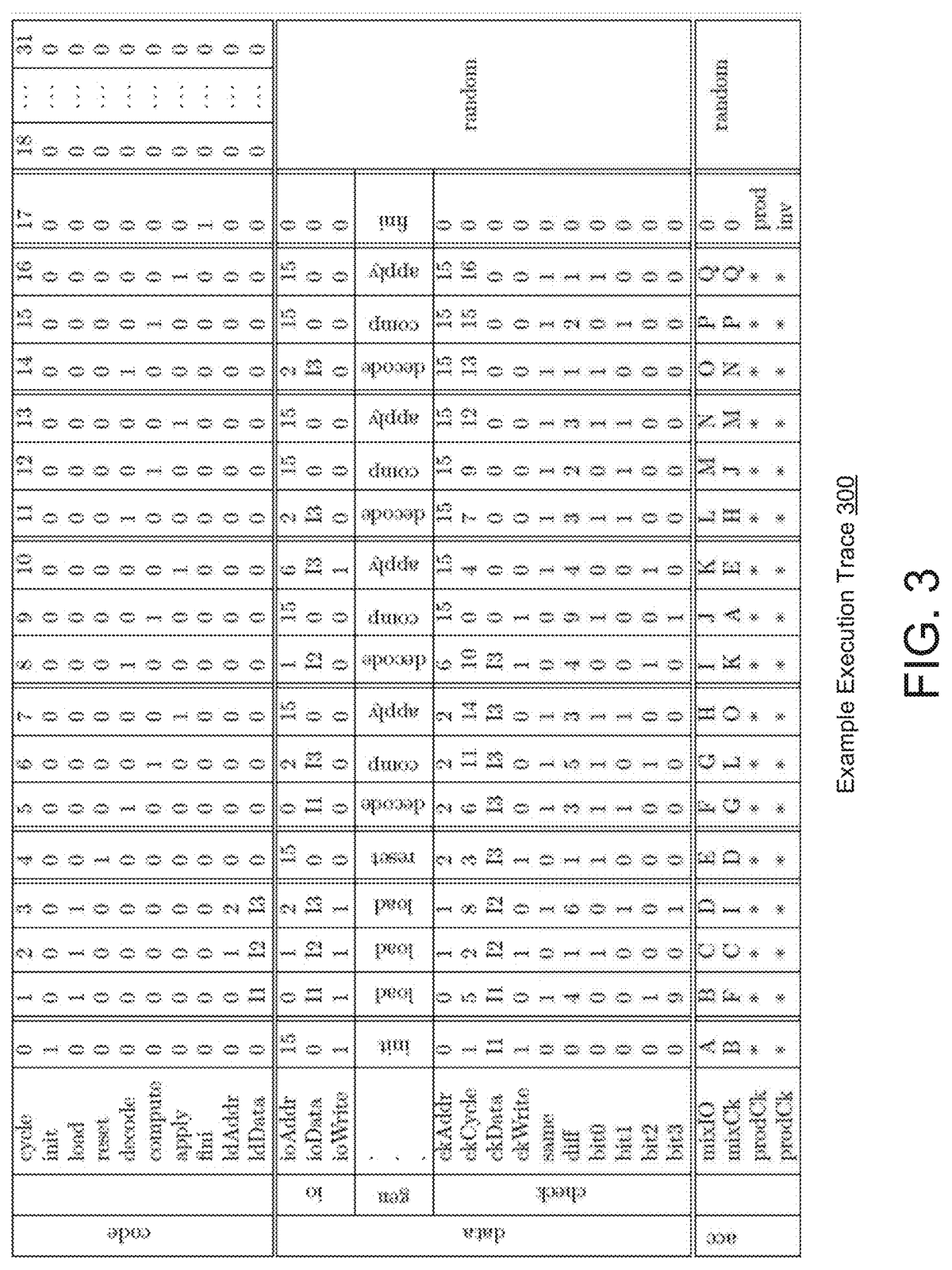

FIG. 3 illustrates an example execution 300 of the code 200 in FIG. 2. Note that during the generation of a trace, the same basic structure may be followed, as the values to be used in the check section of data can be determined until the program ends. In some implementations, the execution trace 300 may illustrate the main execution phase.

Main Execution Phase

The example execution 300 may include a code group, data group, and an acc group. In cycle 0, the code group has 'init' set for the initialization cycle. This cycle may write a zero to the highest memory address (in data/io), which can be used as a dummy address to read from when no other memory transaction is needed by the cycle in question.

Cycles 1-3 may include a 'loading' of the program from the code group into memory transactions. When the 'load' bit is set in the code group, constraints that equate ldX and ioX and set write can be activated. In one example, the constraints are:

```
if (load(c)) {
    ioAddr(c) = = IdAddr(c);
    ioData(c) = = IdData(c);
    ioWrite(c) = = 1;
}
```

Cycle 4 is a reset and may clear the registers (held in 'gen' during reset and apply cycles) and perform a dummy memory read. The next 12 cycles may represent operations of the processor and can follow the logic from FIG. 1. The 3 cycle pattern can be encoded in the code group. The memory I/O for decode may include the next instruction to decode where reads are done in "comp" and writes are performed in "apply." In a case where there is no need for a memory transaction, a dummy read can be performed. Note that upon halt, the PC may no longer advance, and in general the code group can prepare as many 3 cycles instructions as may be needed to run the program, which is not determined in advance according to this example. In a case where the program halts early, the program may stay halted until final termination at fini However, if the program is not terminated by then, the constraints of fini may fail.

Cycle 17 may include the fini cycle, which can verify the prior decode was a halt, and is important for memory verification as well.

Finally, some cycles may be left unconstrained to allow the data and acc groups to be padded with random values, which support the zero knowledge properties of the underlying proof system.

Memory Checking

In one example, the memory transactions generated during execution (i.e., "ioX") may be sorted by address and the original cycle in which they occurred. The data may be placed into "ckX," which can additionally include the cycle (which was implied via the cycle register in the code group for the equivalent ioX transactions). To verify memory correctness, the "ckAddr" may move forward, which represents a new address in the correct order, or the "ckAddr" can remain fixed while "ckCycle" moves forward. To perform the verification, the difference may be computed and show that the difference is small via decomposing it into bits. Where the field used in the proof system includes a characteristic that is more than twice as large as the maximum allowed cycles, this condition may prevent an incorrect ordering. Additionally, if the transaction is a read, then the data value can be verified to match the prior cycle. This allows writes to modify the value but ensures all following reads until the next write see this same value. A possible specific set of constraints for such a set of verification constraints is shown in FIG. 4.

Permutation Checking

After the memory checking, the I/O memory transactions may be confirmed to represent a valid CPU execution and that the check memory transactions represent valid RAM. In addition, these two transactions sets may be verified to be permutations of each other. In at least one example, and following the logic of Plonk protocol, the verifier may pick a random mixing value "mix" after receiving the data group commitment, or use a Fiat-Shamir heuristic mix, a function of the root hash of the data group commit. The elements of the "io" and "ck" transactions may be mixed (with the code cycle used as the cycle for io case) using "mix." The resulting mixed values should each be a permutation of the other. These can be accumulated in the acc group, with cycle 0 (init) ignoring prior cycles, and each further cycle multiplying the new mix by the prior accumulated value. In at least one example, in the "fini" cycle, the accumulated values may be verified to be matched and/or that the accumulated value is invertible, to verify that no 0s were present during accumulation which would invalidate the products. This may probabilistically prove that the two sets of memory transactions can be permutations of each other via the logic loading out in the Plonk paper. An example of the permutation checking constraints can be seen in FIG. 5.

Recursion

In one or more examples, to make a recursive ZKP, the verification of the ZKP may be represented inside a proof efficiently. Because the mechanism described above can execute arbitrary Turing complete code, it may be straightforward to implement a verifier in the proof system. Thus, one issue remaining may be one of efficiency. For example, the performance-critical operation performed during proof-verification may include the evaluation of cryptographic hashes. By accelerating this operation, the time to prove a verification can be brought to a practical level even in zk-STARKs.

SHA-256

FIG. 6 illustrates an example pseudocode for the mixing function. In one example, a method to encode the computation of SHA-256 may facilitate a core compression that can be computed in 72 cycles, using, for example, less than 128 registers per cycle. In this example, we note a feature of the SHA-256 mixing function. Consider the pseudocode for the mixing function shown in FIG. 6, where most of the state variables are simply being 'shifted' to other state variables, and only A and E are computed. In at least one example, the code can be transformed to operate instead on an array of A/E values (one per cycle) so that each update sets the latest value of A/E based on the prior 4 values, as shown in FIG. 7. Additionally, we may move the computation of the message schedule into a loop and rearrange the setup and finalization.

In at least one embodiment, the resulting code may be translated into 72 cycles, where each cycle represents one value of i, and for each cycle, a value of W, A, and E may be computed. Referencing the operations within the code, in a case where each of the three registers may be represented as 32 single-bit registers, then the operations can be easily implemented given a field larger than $2^{35}$. For example, the rotates and shifts simply alias bits and so are effectively no-ops. The triple XOR, the choose operation, and the majority operations are all degree 3 polynomials. We can construct the 32-bit encoded values from the bitwise versions via a linear transform and perform the addition of 32-bit values in the field directly. Extra bits may be used to handle the carry/overflow from 32 to up to 35 bits, but this accounts for less than 3 bits for each addition, or 9 registers total (fewer if we allow a larger degree). Finally, constants such as the initial values for H and the values of K can be encoded in the code group so long as SHA operations may be performed with proper alignment.

In one or more embodiments, a few additional control registers may be used for example to generate memory I/O for access to M or H. If only one memory access per cycle is allowed, reads and writes to H may can be handled specially. For example, regarding the initialization via constants, H is fixed and may be read from the code group. For initialization via continuations, H may be initialized by reading back a fixed distance. For writing of H at the end of execution, 4 additional cycles may be added, or alternately, the values to write may be computed via an oracle, written in cycles 64-67, and then verified by local fixed distance access.

Figure 8:
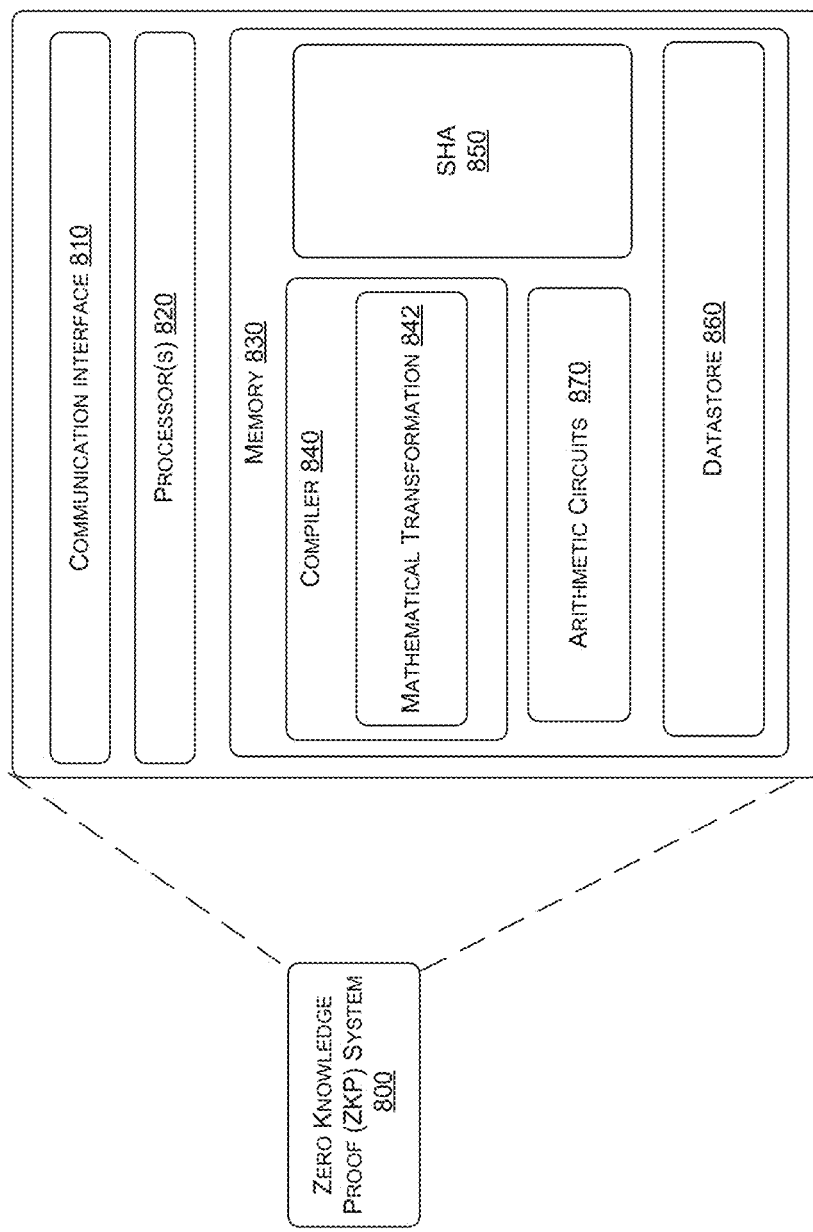
FIG. 8 is an example architecture of a ZKP system that may facilitate the creation of ZKPs to prove the correct execution by a machine in a Von Neumann architecture or an existing instruction set architecture.

FIG. 8 is an exemplary embodiment of a ZKP system that may facilitate the creation of ZKPs to prove the correct execution by a machine in a Von Neumann architecture or an existing ISA e.g., RISC-V. The created ZKPs may include a recursive feature to prove verification of other proofs. The ZKPs may also be post-quantum secure by not relying on cryptographic primitives. In at least one embodiment, the created ZKPs may perform secure mathematical transformations of executable instructions into arithmetic circuits. The secure mathematical transformation may include a set of arithmetic constraints in a proper form, which represent the execution behavior of the machine. The ZKP system 800 may execute the arithmetic circuits. In addition to the secure mathematical transformations, the ZKP system 800 may further implement the cryptographic strength of a proof system and various primitives (e.g., hashing algorithms) when evaluating the ZKP system. In this regard, the ZKP system 800 may be used to prove the correct execution of a virtual processor—enabling compilable programs to be run in a provable manner.

In the illustrated example, the ZKP system 800 may comprise one or more components of a server or that may operate in a server environment, for example a cloud infrastructure, and including without limitation a communication interface 810, one or more processors 820, and a memory 830. The memory 830 may include a compiler 840, an SHA 850, a datastore 860, and arithmetic circuits 870. The compiler 840 may convert ISA (e.g., RISC-V) instructions via a mathematical transformation module 842, which includes executable instructions for converting the instructions into the arithmetic circuits 870 as described herein. The SHA 850 represents storage of one or more secure hash algorithms such as SHA-256 described herein. The datastore 860 may include information that can be used to support the operation of the ZKP system 800. In one example, the datastore 860 may include, for example and without limitation, configurations of arithmetic circuits, historical configurations of arithmetic circuits, and corresponding historical mathematical transformations.

Communication interface 810 may include hardware, software, or a combination of hardware and software to transmit and/or receive data. Communication interface 810 may include a transceiver that facilitates wired or wireless communications through a cellular network or a broadband network. For example, the communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), or any broadband network, and further enabled with technologies such as, by way of example, Global System for Mobile Communications (GSM), Personal Communications Service (PCS), Bluetooth, WiFi, Fixed Wireless Data, 2G, 5G (new radio), etc.

Processor(s) 820 may be a central processing unit(s) (CPU), graphics processing unit(s) (GPU), both a CPU and GPU or any other sort of processing unit(s). Each of the processor(s) 820 may have arithmetic logic units (ALUs) that perform arithmetic and logical operations as well as one or more control units (CUs) that extract instructions and stored content from processor cache memory, and then execute these instructions by calling on the ALUs as necessary during program execution. The processor(s) 820 may also be responsible for executing computer applications stored in the memory, which can be associated with common types of volatile (RAM) and/or non-volatile (ROM) memory.

In one or more examples, the processor(s) 820 may use the compiler 840 in the memory 830 to prove the correct execution of the virtual processor—enabling compilable programs to be run in a provable manner. In one example, such as in RISC-V architecture, the processor(s) 820 may depend on the compiler or programmer as the knowledge of the compiler may plays a role while converting CISC code to a RISC code and, thus, the quality of the generated code depends on the compiler.

Memory 830 may be implemented using computer-readable media, such as computer-readable storage media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read-Only Memory (ROM), Electrically Erasable Programmable Read-Only Memory (EEPROM), flash memory or other memory technology, Compact Disc—Read-Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of and are not formed exclusively by, modulated data signals, such as a carrier wave. In contrast, communication media may embody computer-readable instructions, data structures, program modules, or other data in a modulated data signal, such as a carrier wave, or other transmission mechanisms.

The compiler 840, mathematical transformation module 842, arithmetic circuits 870, and SHA 850 may include routines, program instructions, objects, and/or data structures that perform tasks or implement particular abstract data types. In at least one embodiment, the compiler 840, via the mathematical transformation module 842 and SHA 850, may generate the arithmetic circuits 870 and facilitate the proving of the verification of other proofs as described herein.

In some instances, the ZKP system may be implemented in a virtual machine. This implementation may be known as a zero knowledge virtual machine (zkVM) may improve the security and trustworthiness of distributed applications. The zkVM may bridge the gap between ZKPs and various programming languages such as C++ and Rust. ZKP technology may enable the output of a program to carry proof of provenance and correct execution that can be cryptographically verified by a receiver without access to the input of the program. In other words, the output of the program can be checked for correctness by a party who cannot see the inputs. This verifiability allows applications to be decentralized that previously required a trusted third party, which may improve the resilience and economics of operating computing infrastructure.

ZKP techniques such as zero knowledge scalable transparent arguments of knowledge (STARKs or zk-STARKs) and zero knowledge succinct non-interactive argument of knowledge (SNARKs or zk-SNARKs) have been able to show the potential of ZKP-based computations. However, these techniques have required the adoption of new programming languages with sparse tooling support. The ZKP techniques described in this application assist in removing those barriers by bring existing languages, tools, and skills to ZKP development. This application describes a high performance ZKP prover that is used to build a zkVM that implements a standard RISC-V instruction set. Emulation of RISC-V makes compatibility possible with existing mature languages and toolchains. In other words, this provides seamless integration between "host" application code written in a high level language running natively on a host processor (e.g., Rust on arm64 Mac) and "guest" code in the same language executing inside the zkVM (e.g., Rust on RISC-V, and specifically RV32IM).

Figure 9:
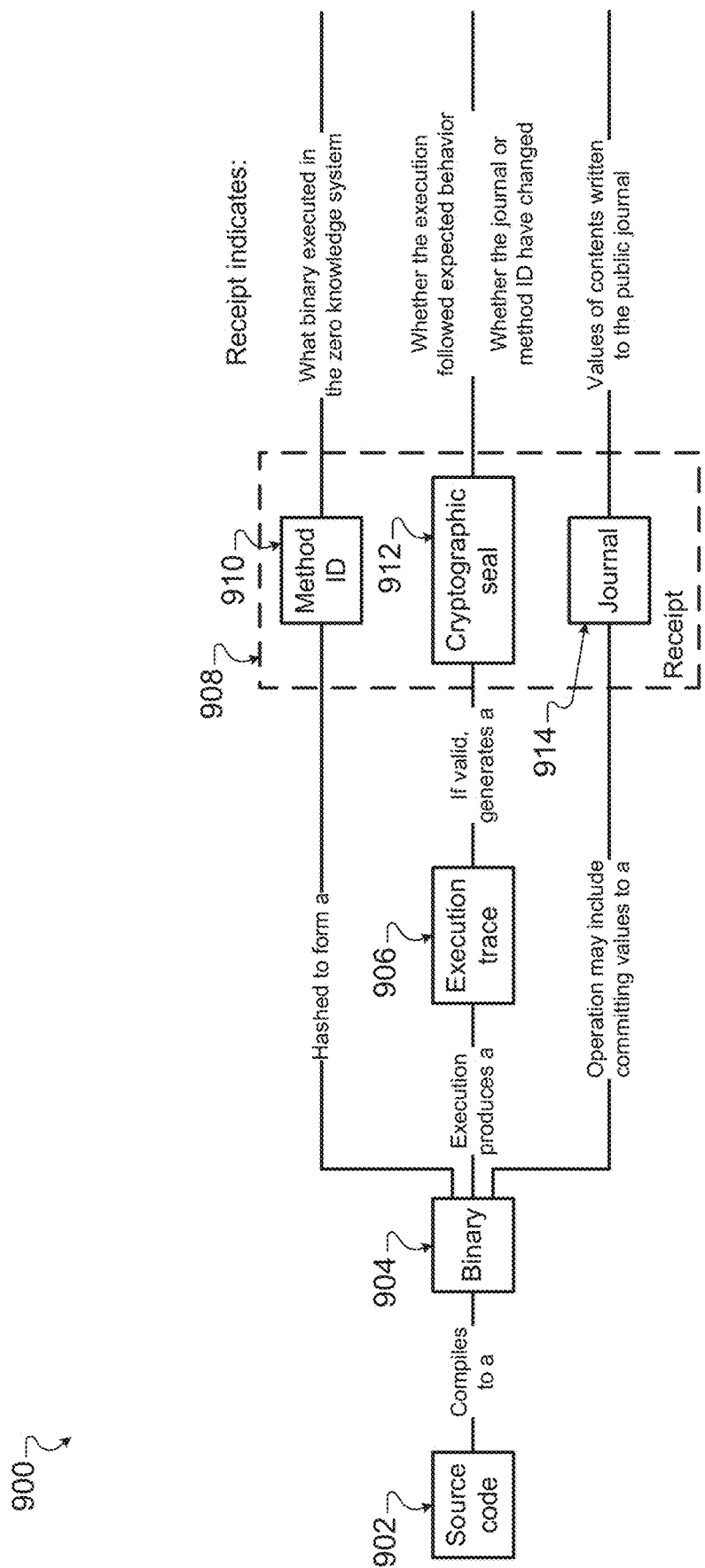
FIG. 9 illustrates example components involved in a ZKP system.

A zkVM is a virtual machine that runs trusted code and generates proof that authenticate the zkVM output. Some zkVM implementations may be based on the RISC-V architecture and may execute code and produce a computational receipt. FIG. 9 illustrates example components involved in a ZKP system 900, which may be a zkVM. Guest source code 902 may be written for the zkVM and be complied into an executable and linkable format (ELF) binary 904. The binary 904 may be executed by the prover, which may return a computational receipt 908 to the host program. Any party with a copy of the computational receipt 908 can verify the execution of the program and read its publicly shared outputs.

Before being executed by the zkVM, guest source code 902 is converted into a RISC-V ELF binary 904. A hash of the binary 904 is used to create the method identifier 910 that uniquely identified the binary being executed. The method identifier 910 is added to the computational receipt 908. The binary 904 may include code instructions to publicly commit a value to the journal 914. The contents of the journal 914 may be read by any party of device with the receipt 908. The journal 914 may include data that is for public output.

After the binary 904 is executed, an execution trace 906 contains a complete record of the zkVM operation. The trace 906 may be inspected and the instructions in the binary 904 may be compared to the operations that were actually performed. A valid trace may indicate that the binary 904 was faithfully executed according to the rules of the RISC-V instruction set architecture.

The trace 906, the journal 914, and the method identifier 910 may be used to generate a seal 912, which may be a blob of cryptographic data that shows the receipt is valid. The seal 912 may have properties that reveal whether itself, the method identifier 910, and/or the journal 914 have been altered. When the receipt 908 is verified, the seal 912 will be checked to confirm the validity of the receipt 908.

In some implementations, when a method executes inside the zkVM, the zkVM may produce the computational receipt 908 along with the output. The receipt 908 may serve as a cryptographic authentication that the given method was executed faithfully. In particular, the receipt 908 may include the method identifier 910 that may serve as an identifier for a particular computation method and a seal 912 that indicates that the associated execution trace 906 satisfies the rules of the RISC-V ISA.

By linking the method identifier 910 to the asserted output of the computation, the computational receipt 908 offers a powerful model for trust in software. The option to check a computational receipt 908 opens the door to verifiable computing to bring trustable software into trustless environments.

The execution trace 906 may be a complete record of computations when code 902 runs on a machine. The execution trace 906 may be a snapshot of the full state of the machine at each clock cycle of the computation.

In some implementations, the execution trace 906 may be a rectangular array where each row shows the complete state of the machine at a given moment in time and each column shows a temporal record of some particular aspect of the computation at each clock cycle. For example, the aspect may be the value stored in a particular address in memory or a particular RISC-V register. A line by line analysis of the trace 906 allows for a computational audit with respect to the program instructions and the underlying computer architecture.

Figure 10:
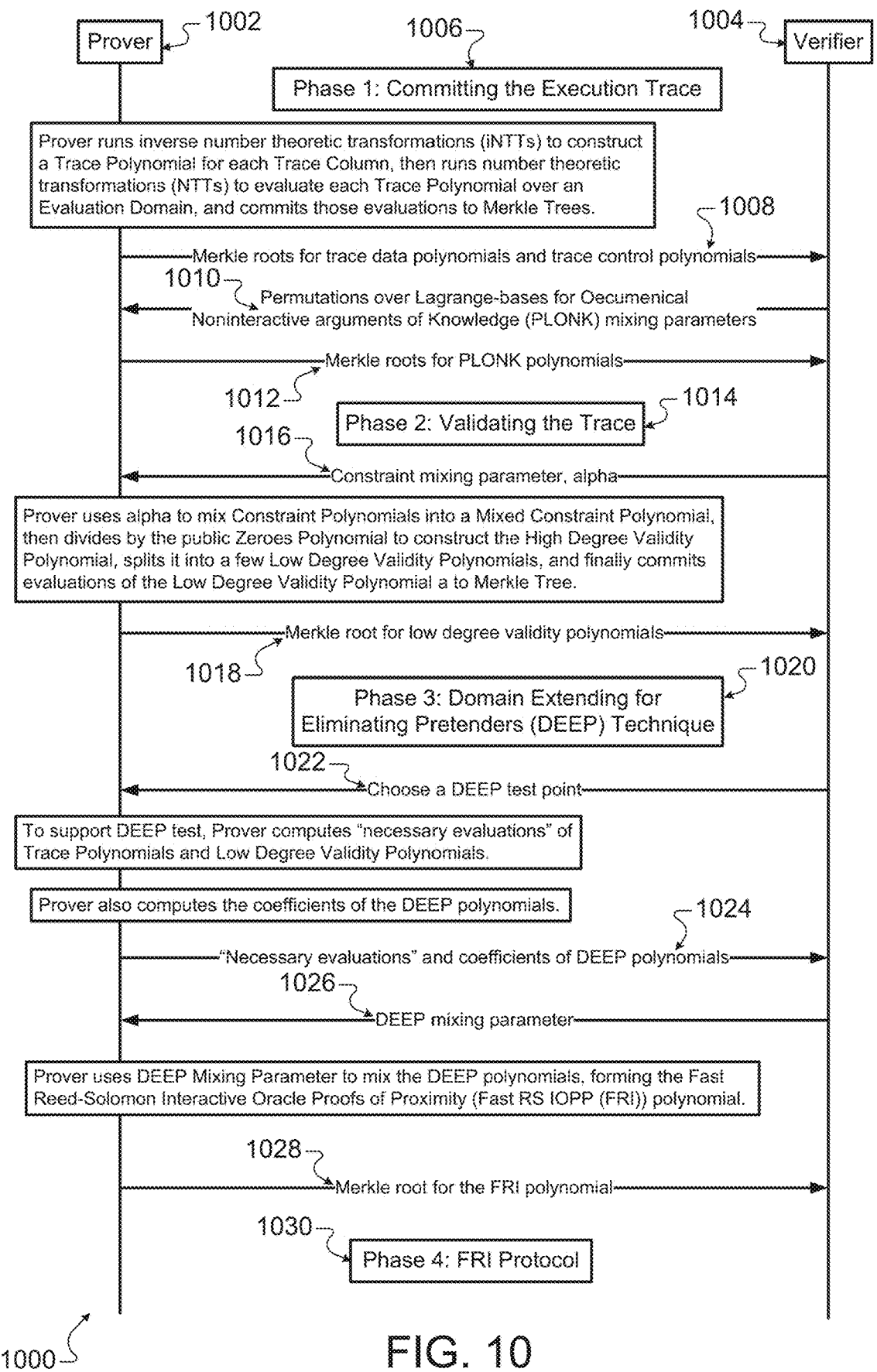
FIG. 10 illustrates an example sequence diagram performed during a ZKP.

FIG. 10 illustrates an example sequence diagram 1000 performed during a ZKP. The sequence diagram 1000 illustrates the data exchanged between the prover 1002 and the verifier 1004. The prover 1002 is executing the code and attempting to prove to the verifier 1004 that the code has executed correctly without revealing execution data of the code. In some instances, this may entail the prover 1002 preventing from revealing the contents of memory during execution of the program to the verifier 1004.

The first phase 1006 of the sequence diagram 1000 may be committing the execution trace. The execution trace may include the contents of various registers of the system and/or contents of random access memory. The prover 1002 may run a computation in order to generate the execution trace. The execution trace is organized into columns, and the columns are categorized as control columns, data columns, and permutations over lagrange-bases for oecumenical non-interactive arguments of knowledge (PLONK) columns. The control columns handle system initialization and shutdown, the initial program code to load into memory before execution, and other control signals that may not depend on the program execution.

The data columns may contain the input and the computation data, both of which are private. The columns are committed in two orderings. A first order may be in order of program execution. A second order may be by register first and clock cycle second. The reordered columns allow for efficient validation of RISC-V memory operations. The PLONK columns are used to show the validity that the reordered data columns are a valid permutation of the original data, according to the PLONK permutation argument. After computing the data columns and the PLONK columns, the prover 1002 adds some random noise to the end of those columns in order to ensure that the protocol is zero knowledge.

The prover 1002 encodes the trace. To perform the encoding, the prover 1002 may convert each column into a polynomial using an inverse number theoretic transformation. These may be trace polynomials. The prover 1002 may evaluate the data polynomials and the control polynomials over an expanded domain and commit the evaluations into two separate Merkle trees (1008). Using these Merkle roots as an entropy-source, the system may, in some implementations, use Fiat-Shamir to choose PLONK mixing parameters, using a secure hash algorithm 2 cryptographic random number generator (SHA-2 CRNG) (1010).

The prover 1002 may use the PLONK mixing parameters to generate the PLONK columns, interpolate them to form the PLONK polynomials, evaluate those polynomials over a larger domain, and commit those evaluations to a Merkle tree. The prover 1002 transmits the Merkle root of each tree to the verifier 1004 (1012). Using these three Merkle roots as an entropy source, the system may use Fiat-Shamir to choose a constraint mixing parameter, alpha, using SHA-2 CRNG.

The second phase 1014 of the sequence diagram 1000 may be validating the execution trace. The prover 1002 may use the constraint missing parameter, the trace polynomials, and the rule checking polynomials to conduct one or more low degree validity polynomials. To do this, the prover 1002 may write k publicly known rule checking polynomials in terms of the private trace polynomials to generate k constraint polynomials. One of the aspects of these polynomials is that for each of the k rules and each input z that is associated with the trace, a given constraint polynomial will return zero if the trace effectively "passes the test."

Using the constraint mixing parameter alpha, the prover 1002 combines the constraint polynomial into a single mixed constraint polynomial by computing the sum of the products of pairs of the constraint mixing parameter alpha and the constraint polynomial. In some implementations, if each constraint polynomial returns zero at some point z, then the mixed constraint polynomial will return zero at z.

Using publicly known zeros polynomials, the prover 1002 computes the high degree validity polynomial which is the mixed constraint polynomial divided by the zeros polynomial. The zeros polynomial may be a divisor of any honest construction of the mixed constraint polynomial. In other words, an honest prover will construct the high degree validity polynomial to be a polynomial of lower degree than the mixed constraint polynomial. This may be referred to as the high degree validity polynomial being a high degree" relative to the trace polynomials.

The prover 1002 splits the high degree validity polynomial into, in some instances, four low degree validity polynomials. The prover 1002 evaluates the low degree validity polynomials, encodes them in a Merkle tree, and sends the Merkle root to the verifier 1004 (1018). In some implementations, the system may use Fiat-Shamir to choose the domain extending for eliminating pretenders (DEEP) test point.

The third phase 1020 of the sequence diagram 1000 may be performing the DEEP technique. The verifier 1004 may be attempting to check the asserted relation between the mixed constraint polynomial, the zeros polynomial, and the high degree validity polynomial. In other words, the verifier 1004 would like to confirm that the mixed constrain polynomial is the product of the zeros polynomial and the high degree validity polynomial.

The prover 1002 transmits the evaluations of each of the low degree validity polynomials evaluated at z, which allows the verifier 1004 to compute the high degree validity polynomial at z. Computing the mixed constraint polynomial at z may be more involved. Because rule check can check relationships across multiple columns and multiple clock cycles, evaluating the mixed constraint polynomial at z may require evaluations of the trace polynomials at various factors of z. The various factors of z may be related to selected column and cycle. The prover 1002 transmits these necessary evaluations of each mixed constraint polynomial to the verifier 1004 so the verifier 1004 may be able to evaluate the mixed constraint polynomial. These calculations may be referred to as "necessary evaluations" of a respective trace polynomial at the various factors of z may be related to selected column and cycle or the taps of the respective trace polynomial at z.

With this information, the verifier 1004 may now be able to check that the that the mixed constrain polynomial is the product of the zeros polynomial and the high degree validity polynomial. In some implementations, these asserted evaluations may not have associated Merkle branches. The DEEP technique may offer an alternative to the Merkle proof.

The prover 1002 may construct the DEEP polynomial using the taps of the respective trace polynomial at z. The DEEP polynomial may be defined as $P'_i(x) = (P_i(x) - \overline{P_i(x)})/((x-x_1) \ldots (x-x_n))$ where $P_i(x)$ is the trace polynomial and $\overline{P_i(x)}$ is the polynomial formed by interpolating the taps of the trace polynomial. The prover 1002 computes the DEEP polynomial for a given i, runs an inverse number theoretic transformation on the result and sends the coefficients of the DEEP polynomial to the verifier 1004. Using this technique, the prover 1002 constructs and sends a DEEP polynomial for each of the DEEP polynomial for each I and each low degree validity polynomial.

At this point, the claim of trace validity has been reduced to the claim that each of the DEEP polynomials is actually a low degree polynomial. To conclude the proof, the prover 1002 mixes the DEEP polynomials into the Fast Reed-Solomon Interactive Oracle Proofs of Proximity (Fast RS IOPP (FRI)) polynomial using a DEEP mixing parameter and using the FRI protocol to show that the FRI polynomial is a low degree polynomial.

Figure 11:
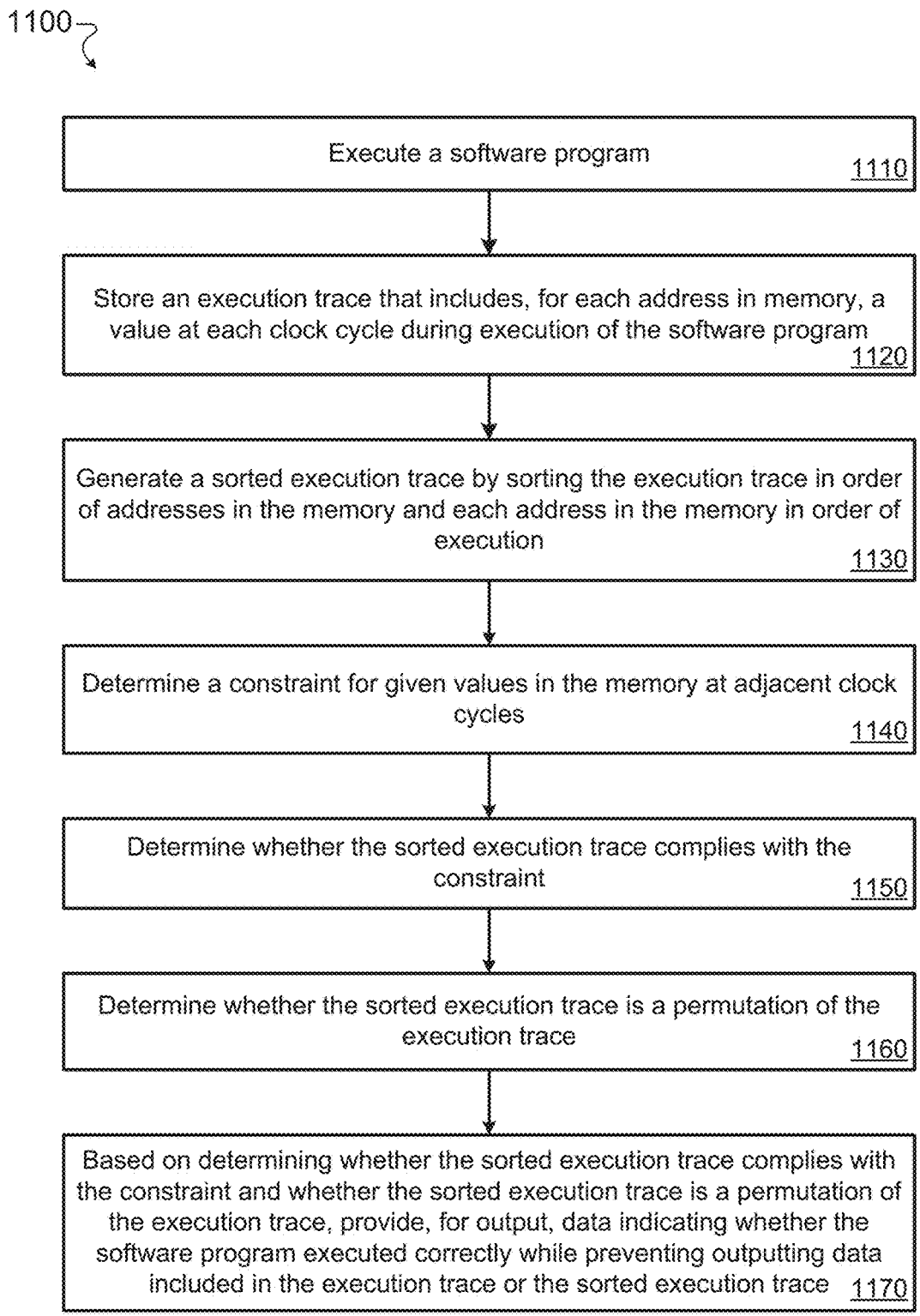
FIG. 11 is a flowchart of an example ZKP process.

FIG. 11 is a flowchart of an example ZKP process 1100. In general, the process 1100 executes a software program. The process 1100 generates an execution trace that indicates the state of the memory during each clock cycle during execution of the software program. The process 1100 sorts the execution trace, compares the sorted and unsorted execution trace, and determines whether the sorted and unsorted execution trace comply with various constraints. Based on those, the process 1100 outputs data indicating whether the software program executed correctly while preventing output of all or a portion of the execution trace, the inputs and/or the outputs to the software program, and/or contents of one or more registers before, during, and/or after execution. The process 300 will be described as being performed by the system 800 of FIG. 8 and will include references to components of the FIG. 8.

The system 800 executes a software program (1110). In some implementations, the system 800 has a von Neumann architecture. In some implementations, the software program receives inputs. The system 800 may prevent output of the inputs. In other words, the system 800 may maintain the inputs as private data that other parties and/or computing devices are unable to read.

The system 800 stores an execution trace that includes, for each address in memory 830, a value at each clock cycle during execution of the software program (1120). In some implementations, the system 800 may prevent another computing device and/or party from determining the values in the memory 830 before, during, and/or after execution of the software program. In some implementations, the system 800 may prevent another computing device and/or party from determining the values in any registers before, during, and/or after execution of the software program.

The system 800 generates a sorted execution trace by sorting the execution trace in order of addresses in the memory and each address in the memory in order of execution (1130). For example, the first portion of the sorted execution trace may be the values of memory location 0x0000 in sequential order of the clock cycles, with clock cycle zero first. The second portion of the sorted execution trace may be the values of the memory location 0x0001 in sequential order of the clock cycles, with clock cycle zero first. This pattern may continue until all memory values are accounted for.

The system 800 determines a constraint for given values in the memory at adjacent clock cycles (1140). In some implementations, the constraint is a polynomial constraint. The system 800 determines whether the sorted execution trace complies with the constraint (1150). To make this determination, the system 800 may not be required check each value in the sorted execution trace. The system 800 may determine that the sorted execution trace complies with the constraint by confirming that a threshold number of the values in the sorted execution trace comply with the constraint.

The system 800 determines whether the sorted execution trace is a permutation of the execution trace (1160). To make this determination, the system 800 may not be required to compare each value in the sorted and unsorted execution traces. The system 800 may determine that the sorted execution trace is a permutation of the execution trace by confirming that a threshold number of the values in the sorted execution trace match the corresponding values of the unsorted execution trace. The system 800 makes this determination to provide evidence that the execution trace was sorted correctly and that the determinations made based on the sorted execution trace can be trusted. The system 800 can prove correct sorting without outputting the sorted and unsorted execution traces.

Based on determining whether the sorted execution trace complies with the constraint and whether the sorted execution trace is a permutation of the execution trace, the system 800 provides, for output, data indicating whether the software program executed correctly while preventing outputting data included in the execution trace or the sorted execution trace (1170). Without providing any insight into the execution of the software program, the system 800 is about to prove proper execution of the software program to a third party and/or another computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing any claims based on this disclosure.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, the method comprising:
executing, by one or more processors communicatively coupled to a memory, a software program;
generating, by the one or more processors, an execution trace that indicates a state of the memory during each clock cycle while the software program is executed;
sorting, by the one or more processors, the execution trace to generate a sorted execution trace;
comparing the sorted execution trace to an unsorted execution trace and determining whether the sorted and unsorted execution traces comply with one or more constraints;
based on determining whether the sorted execution trace and the unsorted execution trace comply with the one or more constraints, providing, for output by the one or more processors, data indicating whether the software program is executed correctly while preventing outputting one or more of at least a portion of the execution trace, inputs to the software program, outputs to the software program, and contents of one or more registers.

2. The method of claim 1, wherein determining whether the sorted execution trace complies with the one or more constraints comprises:
determining that a threshold number of values in the sorted execution trace complies with at least one constraint.

3. The method of claim 1, wherein the one or more constraints comprise a polynomial constraint.

4. The method of claim 1, further comprising determining whether the sorted execution trace is a permutation of the execution trace by confirming:
that a threshold number of values in the sorted execution trace match corresponding values of the unsorted execution trace.

5. The method of claim 1, wherein the one or more processors and the memory are in a von Neumann architecture.

6. The method of claim 1, wherein
executing the software program comprises providing an input to the software program and
maintaining the input as private data by preventing outputting the input to the software program.

7. A system, comprising:
one or more processors; and
memory comprising a plurality of computer-executable instructions executable by the one or more processors to perform a plurality of actions comprising:
executing, by the one or more processors, a software program;
generating, by the one or more processors, an execution trace that indicates a state of the memory during each clock cycle while the software program is executed;
sorting, by the one or more processors, the execution trace to generate a sorted execution trace;
comparing the sorted execution trace to an unsorted execution trace and determining whether the sorted and unsorted execution traces comply with one or more constraints;
based on determining whether the sorted execution trace and the unsorted execution traces comply with the one or more constraints, providing, for output by the one or more processors, data indicating whether the software program is executed correctly while preventing outputting at least a portion of the execution trace, inputs and outputs to the software program, and contents of one or more registers before.

8. The system of claim 7, wherein determining whether the sorted execution trace complies with the one or more constraints comprise determining that a threshold number of values in the sorted execution trace complies with at least one constraint.

9. The system of claim 7, wherein the one or more constraints comprise a polynomial constraint.

10. The system of claim 7, wherein the plurality of actions further comprising determining whether the sorted execution trace is a permutation of the execution trace by confirming that a threshold number of values in the sorted execution trace match corresponding values of the unsorted execution trace.

11. The system of claim 7, wherein the one or more processors and the memory are in a von Neumann architecture.

12. The system of claim 7, wherein:
executing the software program comprises providing an input to the software program and
maintaining the input as private data by preventing outputting the input to the software program.

13. A non-transitory computer-readable media of a computing device storing computer-executable instructions that upon execution cause one or more computers to perform acts comprising:
executing, by the one or more computers, a software program;
generating, by the one or more computers, an execution trace that indicates a state of a memory within the one or more computers during each clock cycle while the software program is executed by the one or more computers;
sorting, by the one or more computers the execution trace to generate a sorted execution trace;
comparing the sorted execution trace to an unsorted execution trace and determining whether the sorted and unsorted execution traces comply with one or more constraints;
based on determining whether the sorted execution trace and unsorted execution trace comply with the one or more constraints, providing, for output by the one or more computers, data indicating whether the software program is executed correctly while preventing outputting at least a portion of the execution trace, inputs and outputs to the software program, and contents of one or more registers.

14. The non-transitory computer-readable media of claim 13, wherein determining whether the sorted execution trace complies with the one or more constraints comprises
determining that a threshold number of values in the sorted execution trace complies with at least one constraint.

15. The non-transitory computer-readable media of claim 13, wherein the one or more constraints comprise a polynomial constraint.

16. The non-transitory computer-readable media of claim 13, wherein execution of the computer-executable instructions further cause the one or more computers to perform acts comprising determining whether the sorted execution trace is a permutation of the execution trace by confirming:
that a threshold number of values in the sorted execution trace match corresponding values of the unsorted execution trace.

17. The non-transitory computer-readable media of claim 13, wherein:
executing the software program comprises providing an input to the software program and
maintaining the input as private data by preventing outputting the input to the software program.

18. The method of claim 4, wherein determining whether the sorted execution trace is the permutation of the execution trace provides evidence that the execution trace is sorted correctly and that determinations made based on the sorted execution trace are trusted.

19. The system of claim 10, wherein determining whether the sorted execution trace is the permutation of the execution trace provides evidence that the execution trace is sorted correctly and that determinations made based on the sorted execution trace are trusted.

20. The non-transitory computer-readable media of claim 16, wherein determining whether the sorted execution trace is the permutation of the execution trace provides evidence that the execution trace is sorted correctly and that determinations made based on the sorted execution trace are trusted.

* * * * *